T. AND E. KITTELSEN.
METHOD OF MANUFACTURE OF SEMICELLULOSE.
APPLICATION FILED APR. 5, 1919.
1,365,039.
Patented Jan. 11, 1921.
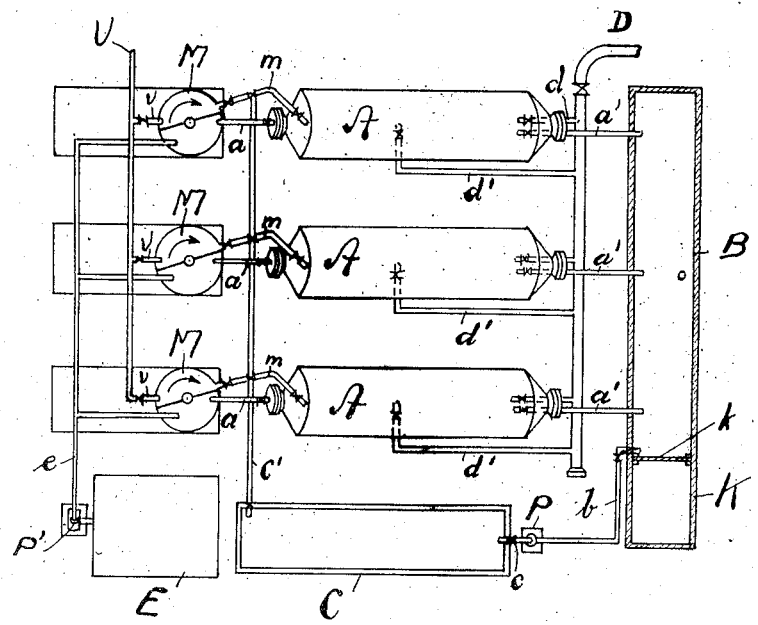
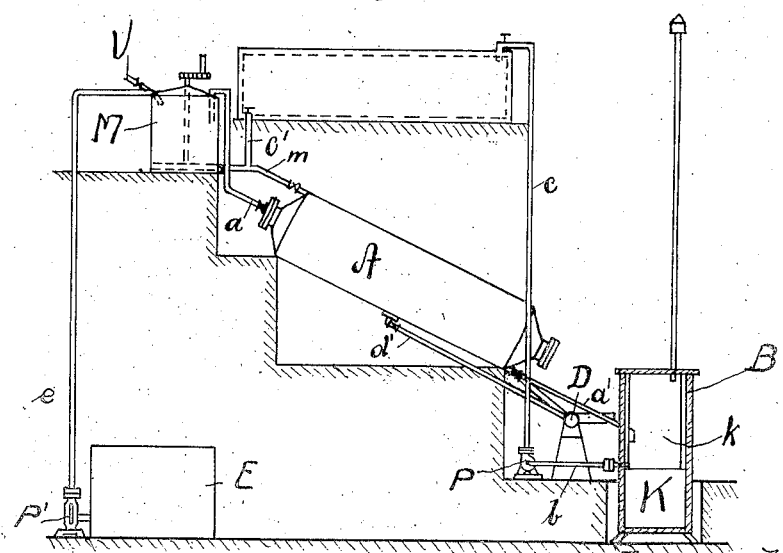

UNITED STATES PATENT OFFICE.

TRYGVE KITTELSEN, OF CHRISTIANIA, AND ERLING KITTELSEN, OF PARISH OF EIDSVOLD, NORWAY.

METHOD OF MANUFACTURE OF SEMICELLULOSE.

1,365,039. Specification of Letters Patent. Patented Jan. 11, 1921.

Application filed April 5, 1919. Serial No. 287,806.

*To all whom it may concern:*

Be it known that we, TRYGVE KITTELSEN and ERLING KITTELSEN, subjects of the King of Norway, and residents of the city of Christiania and the parish of Eidsvold, Norway, respectively, have invented an Improvement in Methods of Manufacture of Semicellulose, of which the following description, in connection with the accompanying drawings, is a specification, like characters on the drawings representing like parts.

The object of this application is the method of manufacture of so-called semicellulose characterized by the wood being prepared first with black lye, then steam-boiled with a mixture of new (strong) lye and waste lye after which the material is cleared with water and then ground and assorted.

A plant suitable for this process is shown on the appended drawing, where Figure 1 is a plan view and Fig. 2 a side view.

A, A, A indicate three boilers which are placed on a foundation so as to have a suitable inclined position. Vertical boilers may also be used.

M, M, M indicate three reservoirs or mixers for the lye. These are furnished with stirrers and the necessary water for the proper dilution of the caustic soda is supplied through a pipe V a branch $v$ to each mixer. In order to utilize the heat and the rest of alkali in the exhaust gases a pipe $a$ leads from the top of each boiler to each mixer. From the mixers M a pipe $m$ leads to the respective boilers for supplying these with new lye.

B is a reservoir into which the black lye is drawn from the boilers through a pipe $a'$.

K is a basin, settling tank, destructive furnace or recovering plant, which is placed lower than the reservoir and serves at all times to receive the surplus of concentrated sediments contained in the waste lye. It therefore communicates with the reservoir B through the wall $k$ which like a sluice may be raised and lowered in guides.

C is a cistern placed somewhat higher than the boilers A. It serves to collect clear black lye for which purpose it is connected to the reservoir B through a line of piping $b$—$c$ in which is inserted a centrifugal pump P. From the cistern C a pipe $c'$ leads to the above mentioned pipe $m$ from the mixers to the boilers.

D is a steam pipe which by inclined boilers is connected to the latter through pipes $d$ leading to the bottom of the boilers and also through pipes $d'$ to about their middle in order to obtain an effective steaming. By vertical boilers the steam connection is arranged with one or more inlets in the bottom.

E is an electrolyzer for decomposing the sodium chlorid and is connected to the mixers M, through a line of piping $e$ with a centrifugal pump P.

The raw material—fir and pine logs—measuring 10 to 13 cm. in diameter and 60 cm. long, are cut through lengthwise in order that the lye shall thoroughly permeate the wood. large logs are split. The logs which preferably should be quite dry are put into the boilers A which thereupon are filled with black lye (cleared from incrustations) from the cistern C through the pipes $c'$ and $m$. When after a certain time the logs are saturated with the black lye, part of the lye is drawn off and the pipe $m$ is opened for supplying the boilers with fresh lye from the mixers M. When the boilers are full the pipe $m$ is shut off and steam is let in from D through the pipes $d$ and $d'$. The steam boiling takes place from 6 to 8 hours, the time varying somewhat with the dryness of the logs and the quality of the wood. After the boiling is finished the steam is shut off and the boilers remain under pressure for about an hour. The pipe $a$ to the respective mixers is then opened and simultaneously the drain $a'$ for emptying the black liquor into the reservoir B is opened. When the lye has been drained off the boilers the logs are thoroughly cleaned by a powerful jet of water, after which they are sent to the mill, where they are ground and sorted or chopped and crushed (kollered). The boilers are now refilled with fresh logs and black lye. For each new boiling process black lye is taken from the cistern C, and freshened with new lye from the mixers. This freshening may also take place in the mixers themselves if so desired. By the first charge before there is any black lye, the lye from the mixers is kept somewhat more concentrated than by later charges. The proportion of black lye and of concentrated lye should be kept about constant and the total quantity for each charge should be sufficient for filling the boiler almost full.

The first charge is kept at about 8° Bé., the following charges of concentrated lye at about 7° Bé. and the mixture at about 8° Bé., about 1° Bé. caustic soda being gained when using black lye. The caustic soda chiefly from the electrolyzers for decomposing the sodium chlorid should preferably be kept at about 15° Bé. This lye is diluted in the mixers M to 7° Bé. with the exhaust gases from the boilers and through the addition of water and black lye.

In the practical use of the method we would prefer to arrange the working in the following manner:—While boiling is carried on in one or more boilers, another set of boilers would be emptied of the black lye and the logs, and a third set of boilers would be charged with logs and lye, whereby continuous working could be carried on with a small number of hands.

The pulp thus obtained may be used in the paper mills for the manufacture of certain kinds of paper such as imitated wrapping paper for cellulose and other kinds, said pulp (semi-cellulose) being used instead of a mixture of cellulose and mechanical wood pulp, as at present used for the manufacture of such products.

What we claim as our invention is:—

1. Method of manufacture of semi-cellulose characterized by that the wood cut in suitable pieces and eventually bored or cut through lengthwise, is at first treated in a boiler for a suitable length of time with cleared black lye without the addition of steam, then for another suitable period of time with a solution of concentrated lye (fresh lye) NaOH from electrolyzers mixed with cleared black lye while being boiled with steam whereupon the lye is thoroughly washed off the wood, which is then ground and sorted or chopped and crushed.

2. Plant for the execution of the method described in claim 1, consisting of a number of vertical or suitably inclined boilers (A), provided with steam inlets at the bottom and—by inclined boilers—also at the middle, mixers (M) corresponding with the boilers for the preparation of fresh lye, said mixers being connected to the boilers through pipes ($m$), a reservoir (B) for collecting the black lye from the boilers, said reservoir through a movable wall ($k$) connected to a basin (K) placed on a lower level for carrying off the heavier lye containing the sediment, and also to a cistern (C) placed on a higher level than the boilers for the purpose of collecting the cleared black lye which is pumped from the reservoir (B) and delivered to the boilers through a pipe having connections to the pipes ($m$).

3. By the method according to claim 1 an arrangement whereby dissolved caustic soda (NaOH) is pumped to the mixers direct from the electrolyzers for being brought to a suitable concentration of 7° or 8° Bé. through mixing either with water or with cleared black lye.

In testimony whereof we have signed our names to this specification.

TRYGVE KITTELSEN.
ERLING KITTELSEN.

Witnesses:
LUDWIG STEFFENS,
N. G. TAUDBERG.